2 Sheets—Sheet 2.
B. PHELPS.
Corn-Planter.
No. 225,719. Patented Mar. 23, 1880.
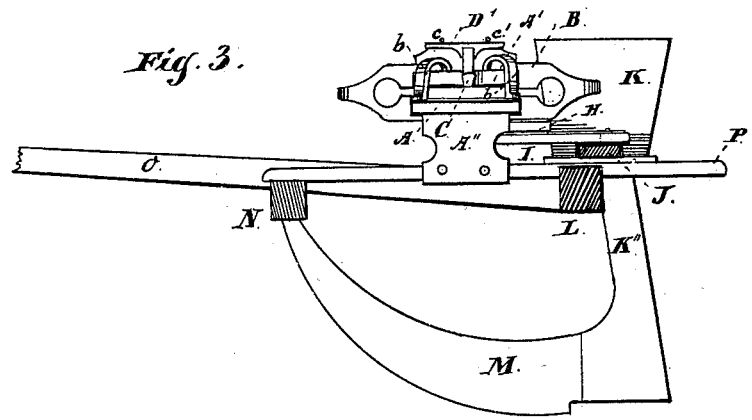
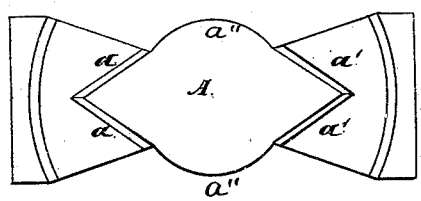
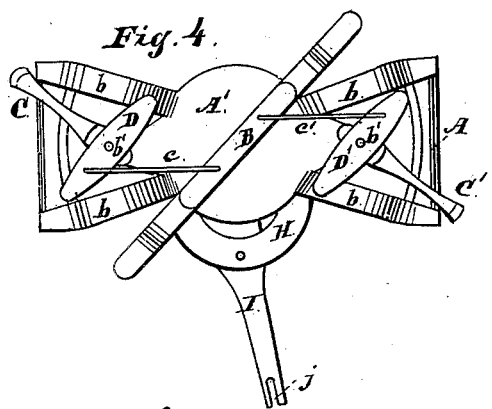
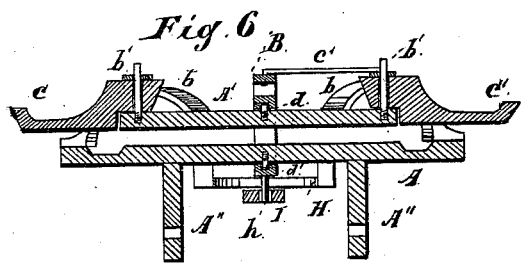
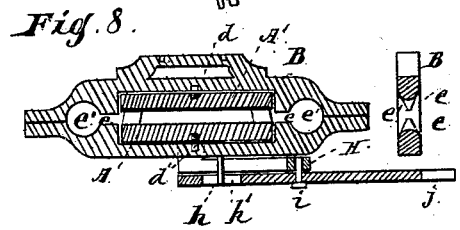
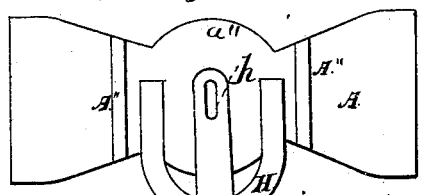
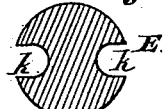
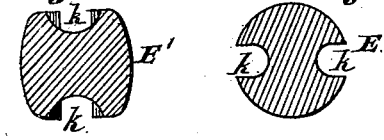
Witnesses
H. F. Bruns.
J. C. Polley Jr.
Inventor:
Byron Phelps.
By West & Bond.
Attys.

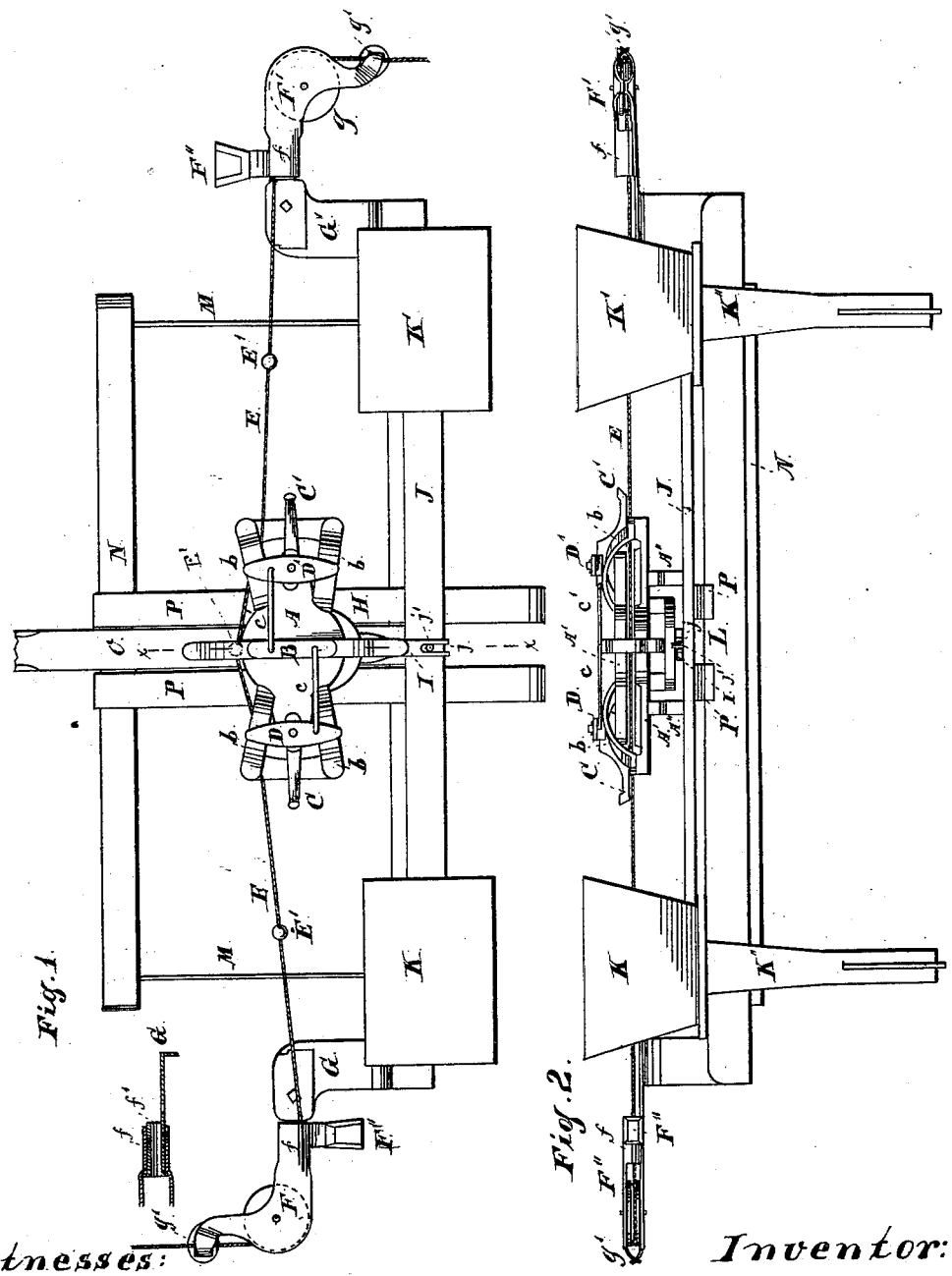

UNITED STATES PATENT OFFICE.

BYRON PHELPS, OF MOLINE, ILLINOIS.

CORN-PLANTER.

SPECIFICATION forming part of Letters Patent No. 225,719, dated March 23, 1880.

Application filed September 19, 1879.

*To all whom it may concern:*

Be it known that I, BYRON PHELPS, of Moline, Rock Island county, State of Illinois, have invented new and useful Improvements in Corn-Planters, of which the following is a full description, reference being had to the accompanying drawings, in which—

Figure 1 is a top or plan view of the front or runner frame of a corn-planter; Fig. 2, a rear elevation of the same; Fig. 3, a side elevation of the same; Fig. 4, a detail of the devices for operating the lever and reciprocating the bar which operates the seeding devices; Fig. 5, a detail of the rope-guiding plate; Fig. 6, a detail, in section, of the devices for operating the seeding mechanism; Fig. 7, an underside view of the lower guide-plate for the rope; Fig. 8, a section on line $x$ $x$ of Fig. 1; Figs. 9, 10, and 11, details of the knots or enlargements on the rope or cable.

This invention relates to that class of corn-planters or seed-planters in which the seeding devices are operated through the medium of a rope or cable stretched across the field, and has for its objects to automatically change the direction of the travel of the rope, so as to cause it to engage with and impart movement to the devices which operate the seeding mechanism, and to simplify the construction and operation of the devices which guide the rope in the required line of travel and the devices which impart movement to the seeding devices; to support and carry the rope on the machine, so that turning at the end of the field can be accomplished without removing the rope; and to improve, generally, the construction and operation of the devices which actuate or move the seeding mechanism; and its nature consists in providing a passage to allow the rope or cable to have a lateral movement, which passage is formed between two plates, the under one of which has V-shaped tracks or guides for rope knots or enlargements to travel against; in providing a lever centrally pivoted and having a slot or opening at its center; in providing the lever with projections or points at each end, separated by an opening which communicates with a larger opening, so that the rope-knots can operate the lever and then pass out of contact therewith; in providing switches arranged to operate in conjunction with the V-shaped tracks or guides, to cause the knots or enlargements on the rope to engage each end of the slotted lever alternately; in connecting the slotted lever with the lever for operating the seeding mechanism by a pin and slot so located as to give the proper throw to the lever to operate the seeding devices; in connecting the slotted lever and the switches together, so that the movement of the lever will operate the switches; in providing fixed or stationary rope-guides located in line with the center of the movement to insure the passage of the rope across the planter in the same line; in providing revolving pulley-supports for the rope, having their center of motion in line with the center of the rope-guides, for changing the travel of the planter without removing the rope; and in the several parts and combination of parts hereinafter set forth as new.

In the drawings only the forward or runner frame of a corn-planter is represented, as my improvements relate to the devices for operating the seeding mechanism, which is located on such frame.

A A' represent two plates. The lower plate has two standards or supports, A'', by means of which it is attached to the cross-bars P; but it may be supported in any other suitable manner on such bars. This plate is formed as shown in Fig. 5, its sides at the center having a projecting portion of a circular form, the terminal points at each end being connected by inclines, which start from a point in line with the center of the plate. These inclines $a$ $a'$ form V-shaped tracks or guides, leading from the center to the outer edge of the plate on each side, as shown in Fig. 5. The upper plate, A', has arms or supports $b$ located at each corner, which arms project diagonally from the plate, and are bent or curved, and rest upon the corners of the plate A, as shown, so as to support the plate A' above the plate A and leave an opening or passage between the two plates. The plate A' has a central circular portion corresponding to that of the plate A, and has its sides, at the end, inclined to correspond to the inclines $a$ $a'$, the form of this plate being similar to that of the plate A at the center, over which it is located. The curve of the arms $b$ is such as to leave an enlarged opening between them and the plate A, and their location is such as to leave an open space between them at the ends of the plate A'.

B is a lever pivoted at its center to the center of the disk portion of the plates A A' by pivots $d\ d'$, one, $d$, being located in the upper face of A', and the other in the lower face of A, the lever having a slot or opening to receive the disk portions of the plate, so that the lever will be on the outside of the two plates, as shown in Figs. 4, 6, and 8. At each end of the disk-slot in the lever are projections or points $e$, having an opening or throat between them, which opening is in line with the passage between the two plates A A', and at each end of the lever B is a circular opening, $e'$, into which the slot or passage between the points or stops $e$ opens, as shown in Fig. 8.

C C' are switches, one at each end of the plates A A', located in the space or opening between the arms $b$, and extending down into such space, so as to be a little above the plate A. The outer end of each switch projects beyond the end of the plate A, and their inner end is attached to each end of the plate A' by the pin or pivot $b'$, so that the switch can swing back and forth, these switches acting as prolongations of the inclines or guides $a\ a'$. The rope passes freely under them when free from buttons or balls; but when a ball comes in contact it is guided over to one side or the other, as the switch is inclined, and carried by the guides to one end of the lever B, with which it is held in contact by the curve $a''$ and the projection $e$ of the lever.

D D' are cross bars or arms, respectively rigidly secured to or formed with the inner end of the switches C C', and projecting each side of the switches. The arm D is connected with the lever B by the rod $c$, and the arm D' is connected with the lever B by the rod $c'$, (see Fig. 4,) which rods $c\ c'$ are attached at their inner ends to the lever B at equal distances from its central pivot, and at their outer ends are attached to the arms D D' at their rear and front ends, respectively, so that the movement of the lever will swing the switches in opposite directions.

E is the rope or cable, having knots or enlargements for operating the lever B; E', the knots or enlargements, made of metal or other suitable material, and provided with a groove, $k$, extending entirely around their periphery, as shown in Figs. 9, 10, and 11, which is of sufficient depth to receive the strands of the rope. These knots or balls E' are attached to rope E at the required distance apart, and are secured in position by separating the strands of the rope and inserting the ball or knot into the opening thus formed until the strands of the rope enter the groove $k$, where it can be secured by means of a fastening cord or wire, $k'$, or in any other suitable manner. By this means no slipping can take place, as the rope will bear against the knot or ball in all directions, and the knot will be securely held in place in an efficient, cheap, and simple manner.

F F' are the rope-supports, one at each side of the machine, so arranged that they can revolve. The inner portion or end of each support has a socket or bearing, $f$, by means of which the support is attached to a hollow shank or axis, $f'$, so as to revolve, and the outer portion or end stands at right angles to the inner, and at its extreme end has an eye or opening, $g'$, through which the rope passes. The central or middle portion is flat, and has a space or opening, in which is journaled an anti-friction pulley or guide-wheel, $g$, which wheel is located in the angle between the inner and outer portions of the support or holder.

F'' is a weight attached to the socket $f$ of the support F, and so arranged and sufficiently heavy to counterbalance the tendency of the rope to turn the support on its axis, and thus keep the support level, or nearly so, in use.

G G' are bars or supports, firmly secured at their inner ends to the cross-bar L, and projecting forward of such bar a sufficient distance to bring the hollow axes or pivots $f''$ centrally in line with the center of the plates A A', or check-row movement, one of the axes being attached to the end of each bar or support G G' at each side of the machine.

The opening through the axles or pivots $f''$ is of a sufficient size to allow the knots or balls E' to pass through readily, and by locating them in line with each other and with the center of the movement the rope E will be given a straight line of travel through the center of the movement, except when carried forward or back by the action of the switches C C' and inclines or tracks $a\ a'$, the hollow axles $f''$ acting as guides for the rope.

By thus making the stationary guides for the rope and the pivot for the revolving supports of the same piece, it will be seen that the supports can be turned to bring their outer ends to the front or rear, as required for the travel of the machine, without removing the rope and without changing its position relative to the center of the movement, so that the rope is ready and in position for use, no matter in which direction the machine travels, and at the same time the movement will be operated in both directions of travel.

H is a bar or support, the ends of which, as shown, are secured to the under side of the plate A. This bar H projects out from the plate A to the rear, so as to form a support for the lever which operates the seeding devices, and a sufficient space is left between it and the plate for the lever B to operate.

I is the lever for operating the seeding devices. It is pivoted at $i$ to the under side of the bar H, as shown, and its forward end has a slot, $h'$, which receives a pin, $h$, located on the under side of the lever B, a little in rear of the pivot on which the lever moves. Its rear end has a slot, $j$, which receives a pin, $j'$, on the bar J.

J is the reciprocating bar which operates the seeding mechanism, and which is reciprocated by the lever I. K K' are the seed-boxes, in which are the ordinary seed wheels or devices. K'' are the seed-tubes. L is the frame-piece, on which the seed-boxes are located, one box at each end. M are the runners or shoes; N, the front frame-piece; O, the tongue; P, the cross-bars, between which the tongue is pivoted, and on which the check-row movement is supported by the standards A''.

The parts represented by the letters J, K, K', K'', L, M, N, O, and P are of any of the well-known forms of construction for such parts, and are located, arranged, and operated in any of the well-known manners, except that the reciprocating bar is operated by the check movement from the levers B and I.

The operation will be readily understood. The rope E is attached at both ends, and extends across the field in the usual manner. As the machine travels forward the balls E' on the rope, as it passes across the front of the machine, will engage the lever B and operate the seeding mechanism through the lever I and bar J, the balls E' being made to engage alternate ends of the lever by reason of the line of travel given them through the switches C C' and tracks $a$ $a'$.

As the ball E' strikes the inner end of the lever B that end will be thrown around, the outer end moving in the opposite direction. This movement of the lever, by means of the rods or bars $c$ $c'$, will operate the switches C C' so as to set them properly for giving the next knot or ball E' a line of travel that will make it engage the outer end of the lever B and operate the lever from that end, which movement will carry the switches into position to send the next knot or ball in the direction to engage the inner end of the lever B, so that the knots or balls are made to engage the inner and outer ends of the lever B alternately, the movement of the lever adjusting the switches properly each time. The switches are so arranged in relation to the tracks $a$ $a'$ that when they give the knot or ball a diagonal line of travel they will continue in that line by being in contact with the track on that side.

When the lever B has been carried to its extreme limit in either direction, the knot or ball which has operated it, by being in contact with the projections $e$, will leave the projections and pass through the opening $e'$, the rope or cable passing through the opening between the projections $e$, and when the knot or ball has cleared the lever it will pass down the incline and out at the end of the movement, so that the rope will have a straight line of travel through the movement till the next ball strikes the switch and engages the lever at the opposite end and passes through the opening $e'$ at that end.

When the end of the field is reached the machine can be turned around by simply changing the positions of the supports F F', by reversing which the machine can return, and the devices be operated as before. This turning is much facilitated by having the axis for the revolving rope-supports in line with the center of the movement.

What I claim as new, and desire to secure by Letters Patent, is—

1. A planting movement located to operate between the seed-boxes of a seed-planting machine, composed of fixed guide-plates, switches, and centrally-pivoted lever operating at either end to shift the seed-valves, and a knotted rope or cable arranged to move in a middle line through the plates and swerve alternately from side to side, to operate the lever when traveling in either direction, substantially as specified.

2. In a corn-planter movement, the fixed plate A, provided with inclines $a$ $a'$, arranged to carry the knots or balls of the rope forward or back, as required, substantially as and for the purposes specified.

3. The plate A, provided with inclines or guides $a$ $a'$, in combination with the plate A', having the arms $b$, and supported on the plate A, so as to leave end and switch openings, substantially as and for the purposes specified.

4. The lever B, pivoted at its center to the outer faces of the plates A A', and provided with projections $e$ and openings $e'$ in its ends, substantially as and for the purposes specified.

5. The plate A, provided with the inclines $a$ $a'$, in combination with the switches C C', for carrying the rope, when traveling in either direction, to the front or rear of the check-rower movement, substantially as and for the purposes specified.

6. The lever B, in combination with the switches C C' and rods or links $c$ $c'$, for causing the movements of the lever to adjust the switches, substantially as and for the purposes described.

7. A check-rower movement consisting of the plates A A', slotted lever B, switches C C', and rods $c$ $c'$, for operating the seeding devices by means of a rope having balls or knots, substantially as described.

8. The rotary rope-support F, having an extended rope-receiving arm, and the counterbalance F'', in combination with the support G and hollow arm $f$, substantially as described.

9. The stationary supports G G', having the hollow trunnion or shank $f$, in combination with the rotary rope-supports F F', having the supports $f'$, for making the center of motion of the supports F F' at a point around the guide for the operating-rope, substantially as described.

10. The lever I, pivoted to the lever B and to the support H, in combination with the bar J, for reciprocating the bar to operate the seeding mechanism, substantially as specified.

11. The plates A A', inclines or guides $a$ $a'$, and switches C C', in combination with the lever B, whereby the ends of the lever will be directly and alternately engaged by the rope knots or balls, substantially as and for the purposes specified.

12. The plates A A', switches C C', and lever B, in combination with the lever I and reciprocating bar J, for operating the seeding mechanism of a corn-planter by a knotted rope traveling in either direction, substantially as specified.

13. A vibrating lever outside of the operating-rope and the devices for guiding the rope, and having each end formed with a throat, $e$, and enlarged opening $e'$, to engage the knots or balls of the rope and be released as the limit of movement is reached, whereby the rope has lateral movement and a straight line of travel, substantially as and for the purposes specified.

BYRON PHELPS.

Witnesses:
W. B. HOSTETLER,
J. S. KAUFMAN.